United States Patent
Takahashi et al.

(10) Patent No.: US 6,818,277 B2
(45) Date of Patent: Nov. 16, 2004

(54) MAGNETIC RECORDING MEDIUM AND REPRODUCTION PROCESS USING THE SAME

(75) Inventors: Masatoshi Takahashi, Kanagawa (JP); Hiroaki Doushita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 31 days.

(21) Appl. No.: 10/439,173

(22) Filed: May 16, 2003

(65) Prior Publication Data

US 2003/0215670 A1 Nov. 20, 2003

(30) Foreign Application Priority Data

May 17, 2002 (JP) ..................................... P.2002-143071

(51) Int. Cl.$^7$ ................................................. G11B 5/73
(52) U.S. Cl. ................................. 428/141; 428/694 BR
(58) Field of Search ........................... 428/141, 694 BR

(56) References Cited

U.S. PATENT DOCUMENTS 6,017,605 A    1/2000  Yamazaki et al.

FOREIGN PATENT DOCUMENTS

EP           0 729 135 A2    8/1996

*Primary Examiner*—Stevan A. Resan
(74) *Attorney, Agent, or Firm*—Sughrue Mion, PLLC

(57) ABSTRACT

A magnetic recording medium containing: a support; and a magnetic layer containing a ferromagnetic powder and a binder, wherein the magnetic layer has 100 or less protrusions per 900 $\mu m^2$ on a surface thereof, the protrusion having a height, as measured by AFM, of 30 nm or more, the magnetic layer has a magnetic switching volume of from $0.1 \times 10^{-17}$ to $5 \times 10^{-17}$ mL, the magnetic layer has a coercive force of 2,000 Oe (159.2 KA/m) or more, and a surface of the support, the surface being opposed to the magnetic layer, has a PSD in a machine direction, as measured by an interferometric roughness tester with a magnification of 5 times, of from 500 to 4,000 $\mu m^3$ at a space wavelength of 10 $\mu m$, and a reproduction process containing reproducing the magnetic recording medium by an MR head.

20 Claims, No Drawings

MAGNETIC RECORDING MEDIUM AND REPRODUCTION PROCESS USING THE SAME

FIELD OF THE INVENTION

The present invention relates to a magnetic recording medium comprising a nonmagnetic support and a magnetic layer comprising a ferromagnetic hexagonal ferrite powder dispersed in a binder on at least one surface of the nonmagnetic support, the magnetic recording medium having a low noise and extremely excellent electromagnetic conversion characteristics.

BACKGROUND OF THE INVENTION

In the field of magnetic discs, 2MB MF-2HD floppy discs using Co-modified iron oxide have been generally loaded in personal computers. However, in these days where the data volume to be treated is abruptly increasing, it cannot be said that the capacity of these floppy discs is sufficient. Thus, it has been demanded to realize high capacity floppy discs.

Further, in the field of magnetic tapes, in recent years, as personal computers or workstations diffuse, magnetic tapes for storing computer data as an external storage medium (so-called backup tapes) are eagerly studied. In putting magnetic tapes having such utility into practical use, especially as not only computers become small-sized, but also information throughput increases, improvements in storage capacity have been strongly demanded in order to achieve an increase of the storage capacity and a reduction in size.

Hitherto, it has not been suggested that durability is enhanced by using an aramid base in a tape-like medium of a magnetic recording medium containing iron oxide, Co-modified iron oxide, $CrO_2$, a ferromagnetic metal powder, or a hexagonal ferrite powder.

Media prepared by applying a magnetic layer dispersed in a binder on a nonmagnetic support are widely used. Of these media, those using a ferromagnetic metal fine powder or a hexagonal ferrite fine powder are known excellent in high density recording characteristics. In the case of discs, examples of high capacity discs using a ferromagnetic metal fine powder having excellent high density recording characteristics include 10 MB MF-2TD and 21 MB MF-2SD, and examples of high capacity discs using hexagonal ferrite include 4 MB MF-2 ED and 21 MB Floptical. However, it could not be said that even these discs are sufficient with respect to the capacity and performance.

Under these circumstances, there have been made many attempts to enhance the high density recording characteristics. For example, LS-120 and ZIP discs realize high density recording with a high capacity of from 100 MB to 120 MB. In addition, high density recording with an areal recording density of 0.2 Gbit/inch$^2$ or more is being demanded. The areal recording density is expressed by the product of linear recording density and track density. With respect to currently commercially available discs with a storage capacity of 100 MB class, it is necessary to increase both the linear recording density and the track density several times. For keeping stable recording/reproduction, such high capacity magnetic recording media are required to have a higher dimensional stability than that of the conventional media.

Now, magnetic heads with electromagnetic induction being an operating principle (induction type magnetic heads) have hitherto been used and diffused.

However, in using them in a higher density recording/reproduction region, limits initiate to be seen. That is, for obtaining a high reproducing output, it is necessary to increase the number of coil turns of a reproducing head. However, in this case, there was involved a problem that the inductance increases, and the resistance increases at a high frequency, resulting in a reduction in the reproducing output.

In recent years, reproducing heads with magnetic resistance (MR) being an operating principle are proposed and initiate to be used in hard discs, etc. Further, application of such heads to magnetic tapes is proposed in JP-A-8-227517. The MR heads provide a reproducing output of several times higher than the induction type magnetic heads. Further, since the MR heads do not use an induction coil, they lower an instrumental noise such as impedance and reduce a noise of the magnetic recording media, thereby enabling to obtain a high S/N ratio. In another word, if a noise of the magnetic recording media that has hitherto hided in the instrumental noise is decreased, it becomes possible to undergo good recording/reproduction and abruptly enhance the high density recording characteristics.

For reducing the noise, there may be considered various means. Especially, it is effective to decrease the size of ferromagnetic powder particles. In recent magnetic powders, are used ferromagnetic hexagonal ferrite fine powders having a tabular size of 40 nm or less.

Further, there are surface properties adapted to the MR heads, and the conventional surface designs may not make the MR heads sufficiently exhibit the characteristics. JP-A-10-302243 describes a coating type magnetic recording medium having a low noise and excellent high density characteristics in a recording/reproduction system combined with an MR head. However, even such a coating type magnetic recording medium was not always satisfactory.

SUMMARY OF THE INVENTION

Accordingly, the invention is to provide a magnetic recording medium having good electromagnetic conversion characteristics, especially a markedly improved CN ratio in a high density recording region, and excellent productivity, and especially a coating type magnetic recording medium combined with an MR head, which is low in the noise in a recording/reproduction process.

The invention has been attained by the following means.

(1) A magnetic recording medium comprising a support having thereon a magnetic layer composed mainly of a ferromagnetic powder and a binder, wherein 100/900 $\mu m^2$ or less protrusions having a height, as measured by AFM, of 30 nm or more are present on the surface of the magnetic layer, the magnetic layer has a magnetic switching volume of from $0.1 \times 10^{-17}$ to $5 \times 10^{-17}$ mL and an Hc of 2,000 Oe (159.2 KA/m) or more, and the surface of the support in the magnetic layer forming plane side has a PSD in the machine direction, as measured by an interferometric roughness tester with a magnification of 5 times, of from 500 to 4,000 $\mu m^3$ at a space wavelength of 10 $\mu m$.

(2) A magnetic recording/reproduction process comprising reproducing the magnetic recording medium as set forth above in (1) by an MR head.

DETAILED DESCRIPTION OF THE INVENTION

As the flexible support that is used in the invention, can be used known films such as esters (such as polyethylene terephthalate and polyethylene naphthalate), polyolefins, cellulose acetate, polycarbonates, polyamides, polyimides, polyamide-imides, polysulfones, polyaramids, aromatic polyamides, and polybenzoxazoles. Of these are preferable high-strength supports such as polyethylene naphthalate and polyamides.

Further, if desired, for changing the surface roughness of the magnetic surface and the base surface, it is also possible to use a laminate type support as shown in JP-A-3-224127. These supports may be previously subjected to corona discharge treatment, plasma treatment, easy adhesion treatment, thermal treatment, or dust removing treatment. Moreover, it is possible to apply aluminum or glass as the support of the invention.

The support in the magnetic layer forming plane side has a PSD in the machine direction, as measured by an interferometric roughness tester with a magnification of 5 times, of 500 $\mu m^3$ or more and 4,000 $\mu m^3$ or less, and preferably 800 $\mu m^3$ or more and 2,000 $\mu m^3$ or less at a space wavelength of 10 $\mu m$, and 800 $\mu m^3$ or more and 8,000 $\mu m^3$ or less, and preferably 1,000 $\mu m^3$ or more and 4,000 $\mu m^3$ or less at a space wavelength of 20 $\mu m$, respectively.

For attaining the object of the invention, the support has a central plane average surface roughness, as measured by the MIRAU method using TOPO-3D manufactured by WYKO Corporation, of 8.0 nm or less, preferably 4.0 nm or less, and more preferably 2.0 nm or less. Preferably, such a support is not only small in the central plane average surface roughness but also free from coarse protrusions of 0.5 $\mu m$ or more. Further, the surface roughness shape is freely controlled by the size and amount of fillers that are optionally added to the support. As such fillers are enumerated oxides or carbonates of Ca, Si and Ti as well as organic fine powders such as acrylic resins. Preferably, the support has a maximum height (SRmax) of 1 $\mu m$ or less, a ten point average roughness (SRz) of 0.5 $\mu m$ or less, a central plane peak height (SRp) of 0.5 $\mu m$ or less, a central plane valley depth (SRv) of 0.5 $\mu m$ or less, a central surface area factor (SSr) of 10% or more and 90% or less, and an average wavelength (S$\lambda$a) of 5 $\mu m$ or more and 300 $\mu m$ or less. For obtaining desired electromagnetic conversion characteristics and durability, the surface protrusion distribution of the support can be arbitrarily controlled by fillers, e.g., the number of protrusions having a size of from 0.01 $\mu m$ to 1 $\mu m$ can be controlled each within the range of from 0 to 2,000 per 0.1 $mm^2$. The support that is used in the invention preferably has an F-5 value of from 5 to 50 kg/mm² (from 49 to 490 MPa) and a thermal shrinkage factor of 3% or less, and more preferably 1.5% or less at 100° C. for 30 minutes and 1% or less, and more preferably 0.5% or less at 80° C. for 30 minutes, respectively. Further, the support preferably has a breaking strength of from 5 to 100 kg/mm² (from 49 to 980 MPa) and an elastic modulus of from 100 to 2,000 kg/mm² (from 98 to 19,600 MPa). Moreover, the support has a temperature expansion coefficient of from $10^{-4}$ to $10^{-8}$/° C., and preferably from $10^{-5}$ to $10^{-6}$/° C. and a humidity expansion coefficient of $10^{-4}$/RH % or less, and preferably $10^{-5}$/RH % or less. These thermal characteristics, dimensional characteristics and mechanical strength characteristics are preferably substantially equal in every direction of in-plane of the support with a difference within 10%.

A recording head for recording signals in the magnetic recording medium of the invention should not be particularly limited, but electromagnetic induction type thin film magnetic heads such as MIG heads are suitably used. It is necessary to control the number of protrusions having a height, as measured by AFM, of 30 nm or more (hereinafter sometimes referred to as "$N_{30nm}$") on the magnetic layer surface of the magnetic recording medium of the invention at 100/900 $\mu m^2$ or less.

Further, it is necessary to control a magnetic switching volume (V) of the magnetic layer of the invention at from $0.1 \times 10^{-17}$ to $5 \times 10^{-17}$ mL. Moreover, it is necessary to control a coercive force (Hc) of the magnetic layer of the invention at 159.2 KA/m or more. That is, according to the invention, when the magnetic recording medium having $N_{30nm}$, V and Hc falling within the above-specified ranges is provided in a magnetic recording/reproduction system to record recording signals with an areal recording density of from 0.5 to 2 Gbit/inch² by an MR head, reproduction can be made with a low noise.

The areal recording density is expressed by the product of linear recording density and track density. With respect to currently commercially available discs with a storage capacity of 100 MB class, it is necessary to increase both the linear recording density and the track density several times. When the areal recording density is lower than 0.5 Gbit/inch², such necessity can be attained even without the construction of the invention. On the other hand, when it exceeds 2 Gbit/inch², it is difficult to attain the necessity even by the invention.

$N_{30nm}$ is measured by AFM and is 100/900 $\mu m^2$ or less, and preferably 50/900 $\mu m^2$. Preferably, $N_{30nm}$ is as low as possible, and its lower limit is zero. Further, the number of protrusions having a height, as measured by AFM, of 10 nm or more (hereinafter sometimes referred to as "$N_{10nm}$") on the surface of the magnetic layer is preferably from 500 to 10,000/900 $\mu m^2$, and more preferably from 1,000 to 5,000/900 $\mu m^2$.

When $N_{30nm}$ exceeds 100/900 $\mu m^2$, the noise increases, whereas when $N_{10nm}$ is less than 500/900 $\mu m^2$, the running durability is deteriorated. V is within the range of from $0.1 \times 10^{-17}$ to $5 \times 10^{-17}$ mL. In the case where the ferromagnetic powder is a ferromagnetic metal powder, V is preferably in the range of from $0.1 \times 10^{-17}$ to $4 \times 10^{-17}$ mL, and in the case where the ferromagnetic powder is a hexagonal ferrite powder, V is preferably in the range of from $0.1 \times 10^{-17}$ to $2 \times 10^{-17}$ mL.

When V is less than $0.1 \times 10^{-17}$ mL, though the noise is low, the output is instable, so that an additional device is necessary. On the other hand, when V exceeds $5 \times 10^{-17}$ mL, the characteristics of the MR head with a low noise cannot be applied. When Hc is less than 2,000 Oe (159.2 KA/m), the output is low, so that the areal recording density of from 0.5 to 2 Gbit/inch² cannot be attained. Hc is preferably from 2,500 to 4,000 Oe (from 199 to 318.4 KA/m).

V can be determined according to the following equation. That is, a sweep speed of the magnetic field of the Hc measurement section for 5 minutes and 30 minutes is measured using VSM, and V can be determined from the following relational equation between Hc and magnetic switching volume (V) by Brownian motion.

$$Hc=(2K/Ms)\{1-[(kT/KV)\ln(At/0.693)]^{1/2}\}$$

In the equation, K is an anisotropy constant; Ms is a saturation magnetization; k is a Boltzmann's constant; T is an absolute temperature; V is a magnetic switching volume; A is a spin precession frequency; and t is a magnetic switching time. It is considered that V is related to the particle size of the ferromagnetic powder, especially the particle size influencing the noise. As controlling means of V are enumerated adjustments of particle size of the ferromagnetic powder (for example, particle volume), magnetic characteristics, and orientation of the magnetic layer.

The particle volume is preferably in the range of from $0.5 \times 10^{-17}$ mL to $3.5 \times 10^{-17}$ mL, and more preferably from $0.5 \times 10^{-17}$ mL to $2.5 \times 10^{-17}$ mL with respect to the ferromagnetic metal powder and from $0.1 \times 10^{-17}$ mL to $3.0 \times 10^{-17}$ mL, and more preferably from $0.1 \times 10^{-17}$ mL to $1.5 \times 10^{-17}$ mL with respect to the hexagonal ferrite powder, respectively. In the invention, for adjusting the protrusions on the magnetic layer surface, it is important to make the particle sizes of granular components to be contained in the magnetic layer (i.e., a ferromagnetic powder, an abrasive, and carbon black) smaller than those of the conventional ones. Additionally, it is important to keep the degree of dispersion of the powders in the magnetic and/or nonmagnetic coating solutions at a high level and make the surface roughness of the support lower than that of the conventional ones.

Further, the amount of the abrasive is usually in the range of from 2 to 50 parts by weight, and preferably from 5 to 30 parts by weight based on 100 parts by weight of the ferromagnetic powder. Moreover, the amount of the binder resin (including a hardener) to be contained in the magnetic layer is preferably in the range of from 5 to 40 parts by weight, and more preferably from 10 to 30 parts by weight based on 100 parts by weight of the ferromagnetic powder.

For obtaining magnetic recording media with high capacity and high density, it is especially important from the viewpoint of magnetization loss to thin the magnetic layer to 0.30 $\mu$m or less, and preferably from 0.01 to 0.25 $\mu$m. In that case, since the surface shape of the magnetic layer of the invention is easily influenced by the surface protrusions of the support, one must pay attention to the surface shape. Concretely, with respect to the surface shape, it is effective that the central plane average surface roughness (Ra) by the 3D-MIRAU method (as measured in an area of about 250 $\mu$m$\times$250 $\mu$m) is usually 10 nm or less, and preferably 8 nm or less. Further, the lower limit of Ra of the support is preferably about 5 nm from the viewpoints of handling and running durability.

In the invention, the means for preparing the protrusions of the magnetic layer should not be limited to those described above, but the conventionally known means such as calendering treatment, burnishing treatment by an abrasive tape or fibers, and treatment by a cutter can be employed. However, even when such a treatment is not applied, the invention gives rise to an advantage that the foregoing protrusion distribution can be obtained. In the field of personal computers where the tendency of multimedia has increasingly progressed, high capacity recording media have attracted public attentions in place of the conventional floppy discs, and for example, a ZIP disc (areal recording density: 96 Mbit/inch$^2$) has been on sale from IOMEGA CORP., U.S.A. This is a recording medium comprising a lower layer and a magnetic thin layer developed by the present assignee using ATOMM (Advanced Super Thin Layer & High Output Metal Media Technology), and products of 3.7 inches with a recording capacity of 100 MB or more are on the market. The capacity of 100 to 120 MB discs is substantially equal to the capacity of MO (3.5 inches), i.e., one disc has the capacity of recording newspaper articles of from seven to eight month period. A transfer rate indicating a write/readout time of data (information) is 2 MB or more per second, which is equal to a hard disc, and the working speed is 20 times or more of the conventional floppy discs and 2 times or more of MO, and therefore, is extremely advantageous. In addition, as this recording medium comprising a lower layer and a magnetic thin layer is the same coating type medium as the currently used floppy discs, mass production is feasible, and accordingly, it involves a merit such that it is inexpensive as compared with Mo and hard discs.

The present inventors made extensive and intensive investigations based on the knowledge of these media. As a result, the inventors have achieved a magnetic recording medium, especially a disc-like magnetic recording medium having an areal recording density of from 0.5 to 2 Gbit/inch$^2$, which has a markedly big recording capacity as compared with the foregoing ZIP disc and MO (3.5 inches). This recording medium also has high density characteristics and excellent durability, which could never be achieved by any products known in the world, and in particular, the error rate in a high density recording region is noticeably improved. The magnetic recording medium of the invention is also applicable to magnetic tapes such as computer tapes.

The magnetic recording medium of the invention comprises a ultra-thin magnetic layer containing a magnetic powder of ultra-fine particles, which are excellent in high output and high dispersibility, and a lower layer containing a spherical or acicular inorganic powder. By reducing the thickness of the magnetic layer, a magnetic force offset in the magnetic layer can be reduced, the output in a high frequency region can be markedly increased, and overwriting characteristics can be improved. By improving the magnetic head, the effect of the ultra-thin magnetic layer can be further exhibited through a combination with an MR head having a thin MR element thickness, and digital recording characteristics can be improved.

The magnetic layer is preferably a thin layer having a thickness of from 0.01 to 0.25 $\mu$m so as to match the performance required from the magnetic recording system and magnetic head of high density recording. Such a uniform and ultra-thin magnetic layer is attained by high dispersion and high packing density realized by the combined use of a fine magnetic powder and nonmagnetic powder with a dispersant and a highly dispersible binder. For the magnetic powder to be used, ferromagnetic powders having excellent properties in high output, high dispersibility and high randomizing property are used for inducing adaptability to high capacity FD and computer tapes as far as possible. That is, high output and high durability can be attained by the use of ferromagnetic metal powders or ferromagnetic hexagonal ferrite powders of extremely fine particles, which are capable of achieving high output. For realizing a high transfer rate, running stability and durability during high speed rotation can be ensured by using a three dimensional network binder system suitable for a ultra-thin magnetic layer. A composite lubricant capable of maintaining the effect thereof during use under temperature and humidity conditions over a broad range and in high rotation use is incorporated into upper and lower layers. Further, by making the lower layer have a role of the tank of the lubricant so as to be able to always supply an appropriate amount of the lubricant to the upper magnetic layer, the durability of the upper magnetic layer is heightened, and the reliance is enhanced. Also, a cushioning effect of the lower layer can bring about good head touch and stable running property.

A high transfer rate is required in a high capacity recording system. For that sake, it is necessary to take up the rotation speed of the magnetic disc by one or more places as compared with the conventional FD systems. The recording track density is improved with the increase of capacity/density of magnetic recording. In general, a servo recording area is provided on a medium to ensure traceability of the magnetic head against the recording track. In the magnetic recording medium of the invention, a base whose dimensional stability is isotropically heightened is used as the support base, whereby further stabilization of the traceability can be devised. The smoothness of the magnetic layer can be further enhanced by using a hyper-smooth base.

The increment of density of magnetic recording of a disc-like magnetic recording medium requires improvements in the linear recording density and track density. Characteristics of the support are important factors for the improvement in the track density. The dimensional stability of the support base, especially isotropy, is considered in the recording medium according to the invention. Servo recording is an indispensable technique in recording/reproduction of high track density, but the improvement can be contrived from the medium side by making the support base isotropic as far as possible.

Merits that are brought by employing the ATOMM construction are thought to be as follows.
(1) Improvement of the electromagnetic conversion characteristics by the thin layer structure of the magnetic layer.
    (a) Improvement of output in a high frequency region by the improvement of recording demagnetization characteristics.
    (b) Improvement of overwriting characteristics.
    (c) Security of window margin.
(2) High output by smoothing the upper magnetic layer.
(3) Easiness of imparting required functions by functional separation of the magnetic layer.
(4) Improvement of durability by stable supply of lubricants.

These functions cannot be sufficiently attained only by making the magnetic layer in a multiplayer structure. For constituting the multilayer structure, a lower layer and an upper layer are coated, and usually, curing treatment and surface treatment such as calendering are then successively carried out. In the case of FD, as different from magnetic tapes, the same treatments are conducted on the both surfaces. After the coating step, the disc is completed as a final product through a slitting step, a punching step, a shell incorporation step, and a certifying step. If desired, after punching out into a disc-like shape, the disc may be subjected to post treatments such as a thermo treatment at high temperatures (usually from 50 to 90° C.) to accelerate curing of the coated layer and a burnishing treatment by an abrasive tape to cut off the productions on the surface.

The durability is an important factor for the magnetic recording medium. For example, for realizing a high transfer rate, it is necessary to take up the rotation speed of the magnetic disc by one or more places as compared with the conventional FD systems. In the case where the medium is sliding with a magnetic head and parts within a cartridge at a high speed, security of the durability of the medium is an important problem. For enhancing the durability of the medium, there are means such as a binder formulation to increase the film strength of the medium per se and a lubricant formulation to maintain the sliding property of the medium with the magnetic head.

The lubricant is used in combination of a plurality of kinds respectively exhibiting excellent effects in various temperature and humidity environments under which they used, and each lubricant exhibits its function in different temperature (low temperature, room temperature, and high temperature) and humidity (low humidity and high humidity) environments, thereby maintaining a totally stable lubrication effect. By using the two-layer structure of upper and lower layers, the durability of the magnetic layer can be enhanced by making the lower layer have a role of the tank of a lubricant capable of always supplying an appropriate amount of the lubricant to the upper layer. There is a limit on the amount of the lubricant that can be contained in the ultra-thin magnetic layer. Simple reduction of the thickness of the magnetic layer causes the reduction of the absolute amount of the lubricant, leading to deterioration of the running durability. It is possible to make the enhancement of the electromagnetic conversion characteristics compatible with the enhancement of the durability by imparting different functions to the upper and lower layers and making up for each other. This functional separation is especially effective in a system where the medium is slid on the magnetic head at a high speed.

In addition to the maintaining function of a lubricant, a controlling function of the surface electrical resistance can be imparted to the lower layer. In general, for controlling the electrical resistance, solid conductive materials such as carbon black are added in the magnetic layer in many cases. Such materials not only restrict the increase of the packing density of the magnetic powder but also influence the surface roughness of the magnetic layer as its thickness becomes thin. Incorporation of conductive materials in the lower layer can eliminate these defects.

With the progress of multimedia in society, needs for image recording have increased more and more not only in the industry but also in general homes. The high capacity magnetic recording medium of the invention has capabilities of sufficiently responding to demands such as function/cost as a medium for recording images, as well as data such as letters and figures. The magnetic recording medium of the invention ensures reliability for a long period of time and is excellent in cost performance.

[Magnetic Layer]

In the magnetic recording medium of the invention, the lower layer and the ultra-thin magnetic layer may be provided on either one side of the support or may be provided on the both sides. The upper layer may be coated while the lower layer coated is till wet (W/W coating) or may be coated after the lower layer coated is dried (W/D coating). Simultaneous or successive wet on wet coating is preferred in view of the productivity, but in the case of a disc-like medium, wet on dry coating can be sufficiently used. In the multilayer construction of the invention, since the upper layer and the lower layer can be formed simultaneously or successively (with W/W coating), a surface treatment such as a calendering step can be effectively utilized, and the surface roughness of the upper magnetic layer can be improved even when the layer is a ultra-thin layer. The coercive force (Hc) of the magnetic layer is required to be 2,000 Oe (159.2 KA/m) or more, and Bm is preferably from 2,000 to 5,000 G (from 0.2 to 0.5 T) for the ferromagnetic metal powder and from 1,000 to 3,000 G (from 0.1 to 0.3 T) for the hexagonal ferrite powder, respectively.

[Ferromagnetic Powder]

The ferromagnetic powder that is used in the magnetic layer of the invention should not be particularly limited, but preferably includes ferromagnetic powders and hexagonal ferrite powders, each containing α-Fe as a main component. These ferromagnetic metal powders may contain atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B, in addition to the prescribed atoms. Especially, the ferromagnetic metal powder preferably contains at least one of Al, Si, Ca, Y, Ba, La, Nd, Co, Ni and B, and more preferably at least one Co, Y and Al, other than α-Fe. The content of Co is preferably from 0 atomic % or more and 40 atomic % or less, more preferably 15 atomic % or more and 35% or less, and further preferably 20 atomic % or more and 35 atomic % or less based on Fe. The content of Y is preferably 1.5 atomic % or more and 12 atomic % or less, more preferably 3 atomic % or more and 10 atomic % or less, and further preferably 4 atomic % or more and 9 atomic % or less based on Fe. The content of Al is preferably 1.5 atomic % or more and 12 atomic % or less, more preferably 3 atomic % or more and 10 atomic % or less, and further preferably 4 atomic % or more and 9 atomic % or less based on Fe. These ferromagnetic powders may be previously treated with the later described dispersant, lubricant, surfactant, and antistatic before the dispersion. Specific examples thereof are described in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, and U.S. Pat. Nos. 3,026,215, 3,031,341, 3,100,194, 3,242,005 and 3,389,014.

The ferromagnetic powder may contain a small amount of hydroxides or oxides. The ferromagnetic metal powder can be prepared by known production processes as enumerated below. Examples of the production processes include a method comprising reducing a composite organic acid salt (mainly an oxalate) with a reducing agent (such as hydrogen); a method comprising reducing iron oxide with a reducing gas (such as hydrogen) to obtain Fe or Fe—Co particles; a method comprising pyrolysis of a metal carbonyl compound; a method comprising adding a reducing agent (such as sodium boronhydride, hypophosphite, and hydrazine) to an aqueous solution of a ferromagnetic metal to undergo reduction; and a method comprising evaporating a metal in a low pressure inert gas to obtain a fine powder. The thus obtained ferromagnetic metal powder may be subjected to any of known gradual oxidation treatments including a method comprising immersing the powder in an organic solvent and then drying; a method comprising immersing the powder in an organic solvent, charging an oxygen-containing gas to form an oxide film on the surface, and then drying; and a method comprising forming an oxide film on the surface by regulating partial pressures of an oxygen gas and an inert gas without using an organic solvent.

The ferromagnetic metal powder of the magnetic layer of the invention has a specific surface area, as measured by the BET method, of from 40 to 80 m$^2$/g, and preferably from 50 to 70 m$^2$/g. When the specific surface area of the ferromagnetic metal powder is less than 40 m$^2$/g, the noise increases, whereas when it exceeds 80 m$^2$/g, good surface property is hardly obtained, and hence, the both are not preferred. The ferromagnetic metal powder of the magnetic layer of the invention has a crystallite size of from 80 to 180 angstroms, preferably from 100 to 180 angstroms, and more preferably from 110 to 175 angstroms. The ferromagnetic metal powder has a length of the long axis of 0.01 µm or more and 0.15 µm or less, preferably 0.03 µm or more and 0.15 µm or less, and more preferably 0.03 µm or more and 0.12 µm or less. The ferromagnetic metal powder preferably has an acicular ratio of 3 or more and 15 or less, and more preferably 5 or more and 12 or less. The ferromagnetic metal powder has a σs of from 100 to 180 emu/g (from 100 to 180 A·m$^2$/kg), preferably from 110 to 170 emu/g (from 110 to 170 A·m$^2$/kg), and more preferably from 125 to 160 emu/g (from 125 to 160 A·m$^2$/kg). The ferromagnetic metal powder preferably has a coercive force of 2,000 Oe (159.2 KA/m) or more and 3,500 Oe (278.6 KA/m) or less, and more preferably 2,200 Oe (175.1 KA/m) or more and 3,000 Oe (238.8 KA/m) or less.

Preferably, the ferromagnetic metal powder has a water content of from 0.01 to 2%. The water content of the ferromagnetic metal powder is preferably optimized by selecting the kind of the binder. The pH of the ferromagnetic metal powder is preferably optimized by the combination of the binder to be used. The pH range is from 4 to 12, and preferably from 6 to 10. The ferromagnetic metal powder may be subjected to surface treatment with Al, Si, P or oxides thereof, if desired. The amount thereof is from 0.1 to 10% based on the ferromagnetic metal powder. By undergoing the surface treatment, adsorption of a lubricant such as a fatty acid, becomes 100 mg/m$^2$ or less, and hence, such as is preferred. The ferromagnetic metal powder may sometimes contain soluble inorganic ions such as Na, Ca, Fe, Ni, and Sr. Though it is substantially preferred that the ferromagnetic metal powder does not contain such soluble inorganic ions, the characteristics of the ferromagnetic metal powder are not particularly affected when the content of the soluble inorganic ions is 200 ppm or less. Further, the ferromagnetic metal powder that is used in the invention preferably has less voids, and the amount thereof is preferably 20% by volume or less, and more preferably 5% by volume or less. The shape of the ferromagnetic metal powder is no particularly limited, but any shape such as an acicular shape, an ellipsoidal shape, and a spindle shape may be used so far as it satisfies the above-described properties as to the particle size. SFD of the ferromagnetic metal powder itself is preferably small, and is preferably 0.8 or less. It is necessary to make the Hc distribution of the ferromagnetic metal powder narrow. Incidentally, when SFD is 0.8 or less, the electromagnetic conversion characteristics are good, the output is high, the magnetic switching is sharp, and the peak shift is less, and hence, such is suitable for high density digital magnetic recording. For making the Hc distribution narrow, there are methods such as a method of making the particle size distribution of goethite in the ferromagnetic metal powder good and a method of preventing sintering.

Next, the hexagonal ferrite powder will be described. Examples of the hexagonal ferrite that is used in the invention include substitution products of barium ferrite, strontium ferrite, lead ferrite, and calcium ferrite, and Co substitution products. Specific examples include magnetoplumbite type barium ferrite and strontium ferrite, magnetoplumbite type ferrite where the particle surfaces are coated with spinel, and magnetoplumbite type barium ferrite and strontium ferrite partially containing a spinel phase. These hexagonal ferrite powders may contain atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb, in addition to the prescribed atoms. In general, those to which are added elements such as Co—Z, Co—Ti, Co—Ti—Zr, Co—Ti—Zn, Ni—Ti—Zn, Nb—Zn—Co, Sb—Zn—Co, and Nb—Zn can be used. Some of these materials may contain inherent impurities depending upon the raw material and preparation process.

The particle size is from 10 to 100 nm, preferably from 10 to 60 nm, and particularly preferably from 10 to 50 nm in terms of hexagonal plate diameter. Especially, for increasing the track density, in the case of reproduction by an MR head, it is necessary to make the noise low, the plate diameter is preferably 40 nm or less. However, when the plate diameter is less than 10 nm, stable magnetization cannot be expected due to the Brownian motion. When the plate diameter exceeds 100 nm, the noise is high. Any of these cases is not suitable for high density magnetic recording. An aspect ratio (plate diameter/plate thickness) is desirably from 1 to 15, and preferably from 1 to 7. When the aspect ratio is too low, the packing property in the magnetic layer is high so that such is preferred. However, satisfactory orientation is not obtained. On the other hand, when the aspect ratio exceeds 15, the noise becomes large due to stacking between the particles. The specific surface area as measured by the BET method exhibits from 10 to 100 m$^2$/g within this particle size range. The specific surface area generally coincides with the arithmetical computation value from the plate diameter and plate thickness of the particles. Usually, it is preferred that the distributions of the plate diameter and plate thickness of the particles are narrow. While it is difficult to express it numerically, comparison can be made by measuring 500 particles at random from TEM photographs of the particles. The distribution is not a normal distribution in many cases. However, when the distribution is expressed by a standard deviation against the average size upon computation, the value of σ/(average size) is from 0.1 to 2.0. For making the particle size distribution sharp, there are employed methods including not only a method of making the particle formation reaction system uniform as far as possible but also a method of subjecting the formed particles to distribution improvement treatment. For example, there is known a method of selectively dissolving ultra-fine particles in an acid solution. It is usually possible to prepare particles having a coercive force (Hc), as measured as to a magnetic powder, of from about 500 to 5,000 Oe (from 39.8 to 398 KA/m). High Hc is advantageous for the high density recording, but it is limited by a capability of the recording head. In the invention, the magnetic powder has an Hc of from about 2,000 to 4,000 Oe (from 159.2 to 318.4 KA/m), and preferably 2,200 Oe (175.1 KA/m) or more and 3,500 Oe (278.6 KA/m) or less. In the case where the saturation magnetization of the head exceeds 1.4 teslas, it is preferred to make Hc 2,200 Oe (175.1 KA/m) or more. The Hc can be controlled by the particle size (plate diameter and plate thickness), the kinds and amounts of elements to be contained, the substitution sites of elements, and the particle formation reaction conditions. The saturation magnetization σs is from 40 emu/g (Am$^2$/kg) to 80 emu/g (Am$^2$/kg). It is preferred that the σs is high, but as the particles become fine, the σs is liable to become small. For improving the σs, there are known methods such as a method of making magnetoplumbite composite with spinel ferrite and a method of selecting the kinds and amount of the elements to be contained. Further, it is also possible to use W type hexagonal ferrite. It is also employed to treat the particle size surfaces of magnetic powder with substances adaptive to dispersion media and polymers. As the surface-treating agent are useful inorganic compounds and organic compounds. Typical examples include oxides or hydroxides of Si, Al or P, various silane coupling agents, and various titanium coupling agents. The amount of the surface-treating agent is from 0.1 to 10% based on the magnetic powder. The pH of the magnetic powder is also important for the dispersion. Usually, the pH is from about 4 to 12. Though the optimum value of the pH varies depending on the dispersion medium and polymer, the pH is selected from the range of from about 6 to 11 from the viewpoints of chemical stability and preservability of the medium. The water content to be contained in the magnetic powder influences the dispersion, too. Though the optimum value of the water content varies depending upon the dispersion medium and polymer, the water content is usually selected from the range of from 0.01 to 2.0%. Examples of the preparation of hexagonal ferrite include (1) a glass crystallization method in which metal oxides capable of substituting barium oxide, iron oxide or iron are mixed with glass-forming substances such as boron oxide so as to form a ferrite composition, the mixture is melted and quenched to form an amorphous material, and the amorphous material is again heated, rinsed and then pulverized to obtain a barium ferrite crystal powder; (2) a hydrothermal reaction method in which a metal salt solution of barium ferrite composition is neutralized with an alkali, and after removing by-products, the liquid phase is heated at 100° C. or higher, rinsed, dried and then pulverized to obtain a barium ferrite crystal powder; and (3) a co-precipitation method in which a metal salt solution of barium ferrite composition is neutralized with an alkali, and after removing by-products, the residue is dried, treated at 1,100° C. or lower and then pulverized to obtain a barium ferrite crystal powder. However, the invention does not select the preparation method.

[Nonmagnetic Layer]

Next, when the nonmagnetic layer is provided as a lower layer between the support and the magnetic layer, the details of the lower layer will be described below. The lower layer of the invention should not be limited with respect to its construction so far as it is substantially nonmagnetic. Usually, the lower layer is made of at least a resin, preferably a powder such as an inorganic powder or organic powder dispersed in a resin. Usually, the inorganic powder is preferably a nonmagnetic powder, but a magnetic powder can be used within the range where the lower layer is substantially nonmagnetic.

The nonmagnetic powder can be selected from inorganic compounds such as metal oxides, metal carbonates, metal sulfates, metal nitrides, metal carbides, and metal sulfides. Examples of the inorganic compounds include α-alumina having an α-conversion rate of 90% or more, β-alumina, γ-alumina, θ-alumina silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. These compounds may be used alone or in combination. Of these compounds are particularly preferred titanium dioxide, zinc oxide, iron oxide, and barium oxide, with titanium dioxide and α-iron oxide being more preferred, because they have a small particle size distribution and various means for imparting functions. These nonmagnetic powders preferably have a particle size of from 0.005 to 2 μm. If desired, nonmagnetic powders having a different particle size may be combined, or a single nonmagnetic powder having a broad particle size distribution may be employed so as to attain the same effect. A particularly preferred particle size of the nonmagnetic powder is from 0.01 μm to 0.2 μm. Especially, in the case where the nonmagnetic powder is a granular metal oxide, the average particle size is preferably 0.08 μm or less, and in the case where the nonmagnetic powder is an acicular metal oxide, the long axis length is preferably 0.3 μm or less, and more preferably 0.2 μm or less. The tap density is from 0.05 to 2 g/mL, and preferably from 0.2 to 1.5 g/mL. The water content of the nonmagnetic powder is from 0.1 to 5% by weight, preferably from 0.2 to 3% by weight, and more preferably from 0.3 to 1.5% by weight. The pH of the nonmagnetic powder is from 2 to 11, and particularly preferably between 5.5 and 10. The specific surface area of the nonmagnetic powder is from 1 to 100 m$^2$/g, preferably from 5 to 80 m$^2$/g, and more preferably from 10 to 70 m$^2$/g. The crystallite size of the nonmagnetic powder is preferably from 0.004 μm to 1 μm, and more preferably from 0.04 μm to 0.1 μm. The oil absorption using DBP (dibutyl phthalate) is from 5 to 100 mL/100 g, preferably from 10 to 80 mL/100 g, and more preferably from 20 to 60 mL/100 g. The specific gravity is from 1 to 12, and preferably from 3 to 6. The shape may be any of acicular, spherical, polyhedral, or tabular shape. The Mohs' hardness is preferably 4 or more and 10 or less. The SA (stearic acid) adsorption amount of the nonmagnetic powder is from 1 to 20 µmol/m², preferably from 2 to 15 µmol/m², and more preferably from 3 to 8 µmol/m². The pH is preferably between 3 and 6. The surfaces of these nonmagnetic powders are preferably subjected to surface treatment with $Al_2O_3$, $SiO_2$, $TiO_2$, $ZrO_2$, $SnO_2$, $Sb_2O_3$, ZnO, or $Y_2O_3$. Especially, in view of the dispersibility, $Al_2O_3$, $SiO_2$, $TiO_2$, and $ZrO_2$ are preferred, with $Al_2O_3$, $SiO_2$ and $ZrO_2$ being more preferred. These compounds may be used in combination or alone. Further, the surface-treated layer prepared by co-precipitation may be used depending on the purposed. Moreover, there may be employed a method in which the surface is first treated with alumina and then with silica, or vice versa. Additionally, if desired, the surface-treated layer may be a porous layer, but a homogenous and dense layer is generally preferred.

Specific examples of the nonmagnetic powder that is used in the lower layer of the invention include Nanotite (manufactured by Showa Denko, K. K.), HIT-100 AND ZA-G1 (manufactured by Sumitomo Chemical co., Ltd.), α-hematite DPN-250, DPN-250BX, DPN-245, DPN-270BX, DPN-500BX, DBN-SA1 AND DBN-SA3 (manufactured by Toda Kogyo Corp.), titanium TTO-51B, TTO-55A, TTO-55B, TTO-55C, TTO-55S, TTO-55D and SN-100 and α-hematite E270, E271, E300 and E303 (manufactured Ishihara Sangyo Kaisha, Ltd.), titanium oxide STT-4D, STT-30D, STT-30 and DTT-65C and α-hematite α-40 (manufactured by Titan Kogyo Kabushiki Kaisha), MT-100S, MT-100T, MT-150W, MT-500B, MT-600B, MT-100F and MT-500HD (manufactured by Tayca Corporation), FINEX-25, BF-1, BF-10, BF-20 and ST-M (manufactured by Sakai Chemical Industry Co., Ltd.), DEFIC-Y and DEFIC-R (manufactured by Dowa Mining Co., Ltd.), AS2BM and $TiO_2$ P25 (manufactured by Nippon Aerosil co., Ltd.), and 100A, 500A and calcined products thereof (manufactured by Ube Industries, Ltd.). As the nonmagnetic powder are particularly preferred titanium dioxide and α-iron oxide.

By incorporation of carbon black into the lower layer, a desired micro Vickers' hardness can be obtained in addition to the known effects of reducing the surface electrical resistance (Rs) and the light transmittance. Further, it is also possible to obtain the effect of stocking a lubricant by the incorporation of carbon black into the lower layer. Examples of the kinds of carbon black include furnace black for rubber, thermal black for rubber, carbon black for coloring, and acetylene black. The carbon black used in the lower layer should optimize the following characteristics by the desired effects, and sometimes more effects can be obtained by the combined used.

The carbon black used in the lower layer has a specific surface area of from 100 to 500 m²/g, and preferably from 150 to 400 m²/g and a DBP oil absorption of from 20 to 400 mL/100 g, and preferably from 30 to 400 mL/100 g. The carbon black has a particle size of from 5 to 80 nm, preferably from 10 to 50 nm, and more preferably from 10 to 40 nm. The carbon black preferably has a pH of from 2 to 10, a water content of from 0.1 to 10%, and a tap density of from 0.1 to 1 g/mL. Specific examples of the carbon black that is used in the invention include BLACKPEARLS 2000, 1300, 1000, 900, 800, 880 and 700 and VULCAN XC-72 (manufactured by Cabot Corporation), #3050B, #3150B, #3250B, #3750B, #3950B, #950, #650B, #970B, #850B, MA-600, MA-230, #4000 and #4010 (manufactured by Mitsubishi Chemical Corporation), CONDUCTEX SC and RAVEN 8800, 8000, 7000, 5750, 5250, 3500, 2100, 2000, 1800, 1500, 1255 and 1250 (manufactured by Columbia Carbon Company), and Ketjen Black EC (manufactured by Akzo Nobel). The carbon black may previously be surface-treated with a dispersant or grafted with a resin, or a part of the surface thereof may be graphitized before the use. Further, the carbon black may previously be dispersed in a binder before the addition to the coating solution. These carbon blacks can be used within the range not exceeding 50% by weight based on the inorganic powders and within the range not exceeding 40% of the total weight of the nonmagnetic layer. These carbon blacks may be used alone or in combination. Regarding the carbon black that can be used in the invention, for example, Handbook of Carbon Blacks (edited by the Carbon Black Association of Japan) can be referred to.

Further, organic powers can be added in the lower layer according to the purpose. Examples of such organic powers include acrylic styrene-based resin powders, benzoguanamine resin powders, melamine-based resin powders, and phthalocyanine-based pigments. In addition, polyolefinic resins powders, polyester-based resin powders, polyamide-based resin powders, polyimide-based resin powders, and polyfluoroethylene resins can be used. The preparation methods thereof are described in JP-A-62-18564 and JP-A-60-255827.

Binder resins, lubricants, dispersants, additives, solvents, dispersing methods, and the like used for the magnetic layer described below can be used in the lower layer. Especially, with respect to the amounts and the kinds of binder resins, and the amounts and the kinds of additives and dispersants, known techniques regarding the magnetic layer can be applied.

[Binder]

Conventionally known thermoplastic resins, thermosetting resins, reactive resins, and mixtures thereof can be used as the binder to be used in the invention. As the thermoplastic resins are employable ones having a glass transition temperature of from −100 to 150° C., a number average molecular weight of from 1,000 to 200,000, and preferably from 10,000 to 100,000, and a degree of polymerization of from about 50 to 1,000.

Examples thereof include polymers or copolymers containing, as a constructional unit, for example, vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, or vinyl ether, polyurethane resins, and various rubber-based resins. Examples of the thermosetting resins or reactive resins include phenol resins, epoxy resins, polyurethane thermosetting resins, urea resins, melamine resins, alkyd resins, acrylic reactive resins, formaldehyde resins, silicone resins, epoxy-polyamide resins, mixtures of polyester resins and isocyanate prepolymers, mixtures of polyester polyol and polyisocyanate, and mixtures of polyurethane and polyisocyanate. These resins are described in detail in *Plastic Handbook*, published by Asakura Shoten. It is also possible to use known electron beam curable resins in each of the layers. Examples of these resins and producing methods are described in detail in JP-A-62-256219. These resins can be used alone or in combination. Examples of preferred combinations include combinations of at least one member selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of these resins with polyisocyanate.

As the polyurethane resins, can be used those having a known structure, such as polyester polyurethane, polyether polyurethane, polyether polyester polyurethane, polycarbonate polyurethane, polyester polycarbonate polyurethane, and polycaprolactone polyurethane. With respect to all of the binders as enumerated herein, for the purpose of obtaining further excellent dispersibility and durability, if desired, it is preferred to use those into which at least one polar group selected from —COOM, —SO$_3$M, —OSO$_3$M, —p=O(OM)$_2$, —O—P=(OM)$_2$ (wherein M represents a hydrogen atom or an alkali metal salt group), OH, NR$_2$, N$^+$R$_3$ (wherein R represents a hydrocarbon group), an epoxy group, SH, and CN is introduced by copolymerization or addition reaction. The content of the polar group is from $10^{-1}$ to $10^{-8}$ mol/g, and preferably from $10^{-2}$ to $10^{-6}$ mol/g.

Specific example of the binders that are used in the invention include VAGH, VYHH, VMCH, VAGF, VAGD, VROH, VYES, VYNC, VMCC, XYHL, XYSG, PKHH, PKHJ, PKHC and PKFE (manufactured by Union Carbide Corporation), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Denki Kagaku Kogyo Kabushiki Kaisha), MR-104, MR-105, MR110, MR100, MR555 and 400X-110A (manufactured by Zeon Corporation), Nippollan N2301, N2302 and N2304 (manufactured by Nippon Polyurethane Industry Co., Ltd.), Pandex T-5105, T-R3080 and T-5201 Burnnock D-400 and D-21-80, and Crisvon 6109 and 7209 (manufactured by Dainippon Ink and Chemicals, Incorporated), Vylon UR8200, UR8300, UR8700, RV530 and RV280 (manufactured by Toyobo Co., Ltd.), Daipheramin 4020, 5020, 5100, 5300, 9020, 9022 and 7020 (manufactured by Dainichiseika Color & Chemicals Mfg. Co, Ltd.), MX5004 (manufactured by Mitsubishi Chemical Corporation), Sunprene SP-150 (manufactured by Sanyo Chemical Industries, Ltd.), and Salan F310 and F210 (manufactured by Asahi Kasei Corporation).

The amount of the binder that is used in the nonmagnetic layer and the magnetic layer is in the range of from 5 to 50% by weight, and preferably from 10 to 30% by weight based on the nonmagnetic powder or the ferromagnetic powder. When vinyl chloride-based resins are used, the amount thereof is from 5 to 30% by weight, when polyurethane resins are used, the amount of the polyurethane resin is from 2 to 20% by weight, and it is preferred that polyisocyanate is used in an amount of from 2 to 20% by weight in combination with these resins. However, for example, when head corrosion is caused by a slight amount of chlorine due to dechlorination, it is possible to use polyurethane alone or a combination of polyurethane and isocyanate alone. In the invention, in the case where polyurethane is used, it is preferred that the polyurethane has a glass transition temperature of from –50° C. to 150° C., preferably 0° C. to 100° C., and more preferably from 30° C. to 90° C., a breaking expansion of from 100 to 2,000%, a breaking stress of from 0.05 to 10 kg/mm$^2$ (from 0.49 to 98 MPa), and a yielding point of 0.05 to 10 kg/mm$^2$ (from 0.49 to 98 MPa).

The magnetic recording medium of the invention may comprise two or more layers. Accordingly, the amount of the binder, the amount of vinyl chloride-based resins, polyurethane resins, polyisocyanate or other resins contained in the binder, the molecular weight of each resin constituting the magnetic layer, the amount of polar groups, or the foregoing physical properties of resins can of course be varied in the nonmagnetic layer and the magnetic layer, according to necessity. These factors should be rather optimized in the respective layers, and known techniques with respect to multilayer magnetic layers can be used. For example, when the amount of the binder is varied in each layer, it is effective to increase the amount of the binder contained in the magnetic layer to reduce scratches on the surface of the magnetic layer. For making the head touch against the head good, it is effective to increase the amount of the binder in the nonmagnetic layer to impart flexibility.

Examples of the polyisocyanate that is used in the invention include isocyanates such as toluenediisocyanate, 4,4'-diphenylmethanediisocyanate, hexamethylenediiso-cyanate, xylylenediisocyanate, naphthalene-1,5-diisocyanate, o-toluidinediisocyanate, isophoronediisocyanate, and triphenylmethanetricyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR, and Millionate MTL (manufactured by Nippon Polyurethane Industry Co., Ltd.), Takenate D-102, Takenate D-110N, Takenate D-200, and Takenate D-202 (manufactured by Takeda Chemical Industries, Ltd.), and Desmodur L, Desmodur IL, Desmodur N, and Desmodur HL (manufactured by Sumitomo Bayer Urethane Co., Ltd.). These may be used alone or in combination of two or more thereof, taking advantage of a difference in curing reactivity in each layer.

[Carbon Black and Abrasive]

Examples of the carbon black that is used in the magnetic layer of the invention include furnace black for rubber, thermal black for rubber, carbon black for coloring, and acetylene black. It is preferred that the carbon black has a specific surface area of from 5 to 500 m$^2$/g, a DBP oil absorption of from 10 to 400 mL/100 g, a particle size of from 5 to 300 nm, preferably from 10 to 250 nm, and more preferably from 20 to 200 nm, a pH of from 2 to 10, a water content of from 0.1 to 10%, and a tap density of from 0.1 to 1 g/mL. Specific examples of the carbon black that is used in the invention include BLACKPEARLS 2000, 1300, 1000, 900, 905, 800 and 700 and VULCAN XC-72 (manufactured by Cabot Corporation), #80, #60, #55, #50 and #35 (manufactured by Asahi Carbon Co., Ltd.), #2400B, #2300, #900, #1000, #30, #40 and #10B (manufactured by Mitsubishi Chemical Corporation), CONDUCTEX SC, RAVEN 150, 50, 40 and 15, and RAVEN-MT-P (manufactured by Columbia Carbon Company), and Ketjen Black EC (manufactured by Nippon EC Co., Ltd.). The carbon black may previously be surface-treated with a dispersant or grafted with a resin, or a part of the surface thereof may be graphitized before the use. Further, the carbon black may previously be dispersed in a binder before the addition to the magnetic coating solution. These carbon blacks may be used alone or in combination. In the case where the carbon black is used, the amount thereof is preferably from 0.1 to 30% based on the magnetic powder. The carbon black serves various functions such as preventing static charges, reducing a friction coefficient, imparting a light-shielding property, and enhancing a film strength. Such functions vary depending upon the kind of carbon black to be used. Accordingly, it is of course possible to select and determine the kinds, the amounts and the combinations of the carbon blacks to be added to the upper magnetic layer and the lower nonmagnetic layer, on the basis of the foregoing various properties such as particle size, oil absorption, conductivity, and pH, or these should be rather optimized in the respective layers. Regarding the carbon blacks that can be used in the magnetic layer of the invention, for example, *Handbook of Carbon*

*Blacks* (edited by the Carbon Black Association of Japan) can be referred to.

As the abrasive that is used in the invention, known materials essentially having a Mohs' hardness of 6 or more may be used alone or in combination. Examples of such abrasives include α-alumina having an α-conversion rate of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. Further, composites composed of these abrasives (abrasives obtained by surface treatment with other abrasives) may also be used. Compounds or elements other than the main component are often contained in these abrasives, but the intended effect can be attained so far as the content the main component is 90% or more. The abrasive preferably has a particle size in the range of from 0.01 to 2 μm, more preferably from 0.05 to 1.0 μm, and further preferably from 0.05 to 0.5 μm. Especially, for enhancing the electromagnetic conversion characteristics, abrasives having a narrow particle size distribution are preferred. Further, for enhancing the durability, abrasives each having a different particle size may be combined according to necessity, or a single abrasive having a broad particle size distribution may be employed so as to attain the same effect. It is preferred that the abrasive has a tap density of from 0.3 to 2 g/mL, a water content of from 0.1 to 5%, a pH of from 2 to 11, and a specific surface area of from 1 to 30 m$^2$/g. The shape of the abrasive that is used in the invention may be any of acicular, spherical and die-like shapes. Preferably, the abrasive has a shape partly with edges, because a high abrasive property is given. Specific examples of the abrasives include AKP-12, AKP-15, AKP-20, AKP-30, AKP-50, HIT20, HIT-30, HIT-55, HIT60, HIT70, HIT80 and HIT100 (manufactured by Sumitomo Chemical Co., Ltd.), ERC-DBM, HP-DBM and HPS-DBM (manufactured by Reynolds International Inc.), WA10000 (manufactured by Fujimi Incorporated), UB20 (manufactured by C. Uyemura & Co., Ltd.), G-5, Kromex Us and Kromex Ul (manufactured by Nippon Chemical Industrial Co., Ltd.), TF100 and TF140 (manufactured by Toda Kogyo Corp.), β-Random Ultrafine (manufactured by Ibiden Co., Ltd.), and B-3 (manufactured by Showa Mining Co., Ltd.). These abrasives may also be added to the nonmagnetic layer, if desired. By adding the abrasive to the nonmagnetic layer, it is possible to control the surface shape or control the production state of the abrasive. As a matter of course, the particle sizes and amounts of the abrasives to be added to the magnetic layer and the nonmagnetic layer should be set up at optimum values.

[Additive]

As additives that are used in the magnetic layer and the nonmagnetic layer of the invention, are used those having a lubrication effect, an antistatic effect, a dispersing effect, or a plasticizing effect. Examples of the additives include molybdenum disulfide, tungsten disulfide graphite, boron nitride, graphite fluoride, silicone oils, polar group-containing silicones, fatty acid-modified silicones, fluorine-containing silicones, fluorine-containing alcohols, fluorine-containing esters, polyolefins, polyglycols, alkylphosphoric acid esters and alkali metal salts thereof, alkylsulfuric acid esters and alkali metal salts thereof, polyphenyl ether, phenylphosphonic acid, α-naphthylphosphoric acid, phenylphosphoric acid, diphenylphosphoric acid, p-ethylbenzenephosphonic acid, phenylphosphinic acid, aminoquinones, various silane coupling agents, titanium coupling agents, fluorine-containing alkylsulfuric acid esters and alkali metals thereof, monobasic fatty acids having from 10 to 24 carbon atoms (which may contain an unsaturated bond or may be branched) or metal (such as Li, Na, K and Cu) salts thereof, mono-, di-, tri-, tetra-, penta- or hexahydric alcohols having from 12 to 22 carbon atoms (which may contain an unsaturated bond or may be branched), alkoxy alcohols having from 12 to 22 carbon atoms, mono-fatty acid esters, di-fatty acid esters or tri-fatty acid esters comprising a monobasic fatty acid having from 10 to 24 carbon atoms (which may contain an unsaturated bond or may be branched) and a mono-, di-, tri-, tetra-, penta- or hexahydric alcohol having from 2 to 12 carbon atoms, fatty acid esters of monoalkyl ethers of alkylene oxide polymers, fatty acid amides having from 8 to 22 carbon atoms, and fatty acid amines having from 8 to 22 carbon atoms.

Specific examples of the fatty acids include capric acid, caprylic acid, lauric acid, myristic acid, palmitic acid, stearic acid, behenic acid, oleic acid, elaidic acid, linoleic acid, linolenic acid, and isostearic acid. Specific Examples of the esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucic acid, neopetyl glycol didecanoate, ethylene glycol dioleyl. Specific examples of the alcohols include oleyl alcohol, stearyl alcohol, and lauryl alcohol. Also, nonionic surfactants such as alkylene oxides, glycerols, glycidols, and alkylphol ethylene oxide adducts; cationic surfactants such as cyclic amines, ester amides, quaternary ammonium salts, hydantoin derivatives, heterocyclic compounds, phosphoniums, and sulfoniums; anionic surfactants containing an acidic group such as carboxylic acid, sulfonic acid, phosphoric acid, a sulfuric acid ester group, and a phosphoric acid ester group; and amphoteric surfactants such as amino acids, aminosulfonic acids, sulfuric acid or phosphoric acid esters of amino alcohols, and alkylbetains. The details of these surfactants are described in *Handbook of Surfactants* (published by Sangyo Tosho Co., Ltd.). These lubricants and antistatics may not always be 100% pure and may contain impurities such as isomers, unreacted materials, by-products, decomposition products, and oxides. However, the content of such impurities is preferably 30% or less, and more preferably 10% or less.

The lubricants and surfactants that are used in the invention respectively have different physical functions. The kinds, amounts and proportions of combination generating a synergistic effect of these lubricants should be determined optimally in accordance with the purpose. The nonmagnetic layer and the magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amounts of the surfactants are controlled so as to enhance the coating stability, or the amount of the lubricant in the interlayer is made higher so as to enhance the lubricating effect. Examples are by no means limited thereto. In general, the total amount of the lubricants is selected from the range of from 0.1% to 50%, and preferably from 2% to 25% based on the magnetic powder o the nonmagnetic powder.

Further, all or a part of the additives to be used in the invention may be added to the magnetic coating solution or the nonmagnetic coating solution in any step of the preparation. For example, there are the case where the additives are mixed with the magnetic powder before the kneading step, the case where the additives are added during the kneading step of the magnetic powder, the binder and the solvent, the case where the additives are added during the dispersing step, the case where the additives are added after the dispersing step; and the case where the additives are added immediately before the coating. Moreover, according to the purpose, there is the case where the object can be attained by coating a part or all of the additives by simultaneous or successive coating after the coating of the magnetic layer. In addition, according to the purpose, the lubricant can be coated on the surface of the magnetic layer after calendering or after completion of slitting. As the organic solvent that is used in the invention, known solvents such as those described in JP-A-6-68453 can be used.

[Layer Construction]

The thickness of the support of the magnetic recording medium of the invention is from 2 to 100 μm, and preferably from 2 to 80 μm. The thickness of the support for computer tape is in the range of from 3.0 to 6.5 μm (preferably from 3.0 to 6.0 μm, and more preferably from 4.0 to 5.5 μm).

For enhancing the adhesion, an undercoating layer may be provided between the support and the nonmagnetic layer or the magnetic layer. The thickness of this undercoating layer is from 0.01 to 0.5 μm, and preferably from 0.02 to 0.5 μm. The nonmagnetic layer and the magnetic layer may be provided on the both surface sides of the support to form a both-side magnetic layer disc-like medium, or may be provided only one surface side. In the latter case, a back coating layer may be provided on the surface side of the support opposite to the side having the nonmagnetic layer and the magnetic layer for the purpose of static charge prevention and curling correction. The thickness of this back coating layer is from 0.1 to 4 μm, and preferably from 0.3 to 2.0 μm. Known undercoating layers and back coating layers can be used.

The thickness of the magnetic layer of the medium of the invention is optimized according to the saturation magnetization amount of the head to be used, the head gap length, and the recording signal zone, and is generally 0.05 μm or more and 0.25 μm or less, and preferably 0.05 μm or more and 0.20 μm or less. The magnetic layer may comprise two or more layers each having different magnetic characteristics, and known multilayer magnetic layer structures can be applied.

The thickness of the nonmagnetic layer as the lower layer of the medium according to the invention is 0.2 μm or more and 5.0 μm or less, preferably 0.3 μm or more and 3.0 μm or less, and more preferably 1.0 μm or more and 2.5 μm or less. The lower layer of the medium of the invention exhibits the effect of the invention so far as it is substantially a nonmagnetic layer even if, or intendedly, it contains a small amount of a magnetic powder as an impurity, which is as a matter of course regardless as essentially the same construction as in the invention. The term "substantially a nonmagnetic layer" means that the residual magnetic flux density of the lower layer is 100 G (0.01 T) or less, or the coercive force of the lower layer is 100 Oe (7.96 KA/m) or less, and preferably the residual magnetic flux density and the coercive force are zero.

[Back Coating Layer]

In general, a magnetic tape for computer data recording is decidedly required to have an excellent repeating-running property as compared with a video tape and an audio tape. For maintaining such high running durability, it is preferred for the back coating layer to contain carbon black and an inorganic powder.

Two kinds of carbon blacks respectively having a different average particle size are preferably used in combination. In this case, a combined use of fine carbon black having an average particle size of from 10 to 20 nm and coarse carbon black having an average particle size of from 230 to 300 nm is preferred. In general, by incorporation of the foregoing fine carbon black, the surface electrical resistance of the back coating layer and the light transmittance can be set up at low values. There are many kinds of magnetic recording devices making use of light transmittance of a tape and making it as signals of operation, and therefore, the addition of fine carbon black is particularly effective in such a case. Further, the fine carbon black is in general excellent in retention of a liquid lubricant and contributes to the reduction of a friction coefficient when a lubricant is used in combination. On the other hand, the coarse carbon black having a particle size of from 230 to 300 nm has a function as a solid lubricant and forms minute protrusions on the surface of the back coating layer to reduce a contact area and contributes to the reduction of a friction coefficient. However, the coarse carbon black has a drawback such that the particles are liable to drop out from the back coating layer due to the tape sliding during severe running, leading to an increase of the error rate.

Specific examples of fine carbon blacks commercially available include RAVEN 2000B (18 nm) and RAVEN 1500B (17 nm) (manufactured by Columbia Carbon Company), BP800 (17 nm) (manufactured by Cabot Corporation), PRINTEX 90 (14 nm), PRINTEX 95 (15 nm), PRINTEX 85 (16 nm) and PRINTEX 75 (17 nm) (manufactured by Degussa AG), and #3950 (16 nm) (manufactured by Mitsubishi Chemical Corporation).

Further, specific examples of coarse carbon blacks commercially available include THERMAL BLACK (270 nm) (manufactured by Cancarb Limited) and RAVEN MTP (275 nm) (manufactured by Columbia Carbon Company).

In the case where two kinds of carbon blacks respectively having a different average particle size are used in combination in the back coating layer, the content ratio (by weight) of the fine carbon black having a particle size of from 10 to 20 nm to the coarse carbon black having a particle size of from 230 to 300 nm is preferably in the range of from 98/2 to 75/25, and more preferably from 95/5 to 85/15.

The content of carbon black in the back coating layer (the total amount when two kinds are used) is generally in the range of from 30 to 80 parts by weight, and more preferably from 45 to 65 parts by weight based on 100 parts by weight of the binder.

It is preferred to use two kinds of inorganic powders respectively having a different hardness. Specifically, it is preferred to use a soft inorganic powder having a Mohs' hardness of from 3 to 4.5 and a hard inorganic powder having a Mohs' hardness of from 5 to 9. By the addition of a soft inorganic powder having a Mohs' hardness of from 3 to 4.5, a friction coefficient can be stabilized against the repeating-running. Moreover, a sliding guide pole is not scratched off in the hardness within this range. The average particle size of this inorganic powder is preferably in the range of from 30 to 50 nm.

Examples of the soft inorganic powder having a Mohs' hardness of from 3 to 4.5 include calcium sulfate, calcium carbonate, calcium silicate, barium sulfate, magnesium carbonate, zinc carbonate, and zinc oxide. They can be used alone or in combination of two or more. Of these is particularly preferable calcium carbonate.

The content of the soft inorganic powder within the back coating layer is preferably in the range of from 10 to 140 parts by weight, and more preferably from 35 to 100 parts by weight based on 100 parts by weight of the carbon black.

By the addition of the hard inorganic powder having a Mohs' hardness of from 5 to 9, the strength of the back coating layer is strengthened, and the running durability is enhanced. When such a hard inorganic powder is used together with the carbon black and the foregoing soft inorganic powder, deterioration due to repeating sliding is reduced, and a strong back coating layer can be obtained. Further, by the addition of this inorganic powder, an appropriate abrasive force is imparted, and the adhesion of scratched powders to a tape guide pole is reduced. Especially, when the hard inorganic powder is used in combination with the soft inorganic powder (in particular, calcium carbonate), sliding characteristics against the guide pole having a rough surface are enhanced, and the stabilization of the friction coefficient of the back coating layer can also be brought about.

The hard inorganic powder preferably has an average particle size in the range of from 80 to 250 nm (more preferably from 100 to 210 nm).

Examples of the hard inorganic powder having a Mohs' hardness of from 5 to 9 include α-iron oxide, α-alumina, and chromium oxide ($Cr_2O_3$). These powders may be used alone or in combination. Of these are preferable α-iron oxide and α-alumina. The content of the hard inorganic powder is generally from 3 to 30 parts by weight, and preferably from 3 to 20 parts by weight based on 100 parts by weight of the carbon black.

In the case where the foregoing soft inorganic powder and hard inorganic powder are used in combination in the back coating layer, it is preferred to use them selectively such that the difference of hardness between the soft inorganic powder and the hard inorganic powder is 2 or more (more preferably 2.5 or more, and particularly preferably 3 or more).

It is preferred that the two kinds of inorganic powders respectively having a different hardness and a specific average particle size and the two kinds of carbon blacks respectively having a different specific average particle size are contained in the back coating layer. In particular, in this combination, calcium carbonate is preferably contained as the soft inorganic powder.

A lubricant can be contained in the back coating layer. The lubricant can be arbitrarily selected from among those that can be used in the magnetic layer or the nonmagnetic layer as described above. The amount of the lubricant to be added in the back coating layer is generally in the range of from 1 to 5 parts by weight based on 100 parts by weight of the binder.

[Support]

The support that is used in the invention should not be particularly limited, but it is preferred that the support is substantially nonmagnetic and flexible.

[Producing Method]

The process of producing the magnetic coating solution and nonmagnetic coating solution for the magnetic recording medium of the invention comprises at least a kneading step, a dispersing step, and optionally, blending steps to be carried out before and after the kneading and dispersing steps. Any of these respective steps may be composed of two or more separate stages.

All of raw materials for used in the invention, such as a magnetic powder, a nonmagnetic powder, a binder, carbon black, an abrasive, an antistatic, a lubricant, and a solvent, may be added at any step and at any time. Further, each raw material may be added at two or more steps dividedly. For example, polyurethane can be added dividedly at a kneading step, a dispersing step, or a blending step for adjusting the viscosity after dispersion. For achieving the object of the invention, the foregoing steps can be performed partly with conventionally known techniques.

In the kneading step, powerful kneading machines such as an open kneader, a continuous kneader, a pressure kneader, and an extruder are preferably used. In the case where the kneader is used, all or a part of the binder (preferably 30% or more of the total binders) is kneading-treated in an amount ranging from 15 to 500 parts based on 100 parts of the magnetic powder or nonmagnetic powder. The details of the kneading treatment are described in JP-A-1-106338 and JP-A-1-79274. For dispersing the magnetic layer solution and the nonmagnetic layer solution, glass beads can be used, but dispersing media having a high specific gravity, such as zirconia beads, titania beads, and steel beads, are preferable. Optimal particle size and packing density of these dispersing media should be selected. Known dispersing machines can be used.

The following methods are preferably used for coating the magnetic recording medium having a multilayer construction of the invention. As the first method, the lower layer is coated by any of gravure coating, roll coating, blade coating, and extrusion coating devices, which are ordinarily used in the coating of a magnetic coating solution, and the upper layer is coated while the lower layer is still wet by means of the support pressing type extrusion coating device as described in JP-B-1-46186, JP-A-60-238179 and JP-A-2-265672. As the second method, the upper and lower layers are coated substantially simultaneously using the coating head equipped with two slits for feeding the coating solution as described in JP-A-63-88080, JP-A-2-17971 and JP-A-2-26572. As the third method, the upper and lower layers are coated substantially simultaneously using the extrusion coating device equipped with a backup roll as described in JP-A-2-174965. Incidentally, for preventing the deterioration of the electromagnetic conversion characteristics of the magnetic recording medium due to coagulation of the magnetic particles, it is desired to impart shear to the coating solution within the coating head by the methods as described in JP-A-62-95174 and JP-A-1-236968. In addition, with respect to the viscosity of the coating solution, the range of the numerical values as disclosed in JP-A-3-8471 must be satisfied. For realizing the constitution of the invention, a successive multilayer coating method in which the lower layer is coated and dried, and the magnetic layer is then provided thereon can of course be used without impairing the effect of the invention. However, for reducing coating defects and enhancing the quality such as dropout, it is preferred to use the foregoing simultaneous multilayer coating method.

In the case of magnetic discs, isotropic orienting property could be sufficiently obtained in some cases without conducting orientation using orientating devices, but it is preferred to use known random orientation devices for, e.g., disposing cobalt magnets diagonally and alternatively or applying an alternating current magnetic field using a solenoid. In the case of ferromagnetic metal fine powders, the isotropic orientation is in general preferably in-plane two dimensional random orientation, but it may be three dimensional random orientation having vertical components. Further, in the case of hexagonal ferrites, the orientation is in general liable to become three dimensional random orientation in the plane and the vertical direction, but it is possible to make it in-plane two dimensional random orientation. Moreover, it is possible to impart isotropic magnetic characteristics in the circumferential direction by vertical orientation using known methods with, for example, different pole and counter position magnets. Especially, vertical orientation is preferred when the disc is used for high density recording. Circumferential orientation can be conducted using spin coating.

In the case of magnetic tapes, orientation is conducted in the machine direction using a cobalt magnet or a solenoid. It is preferred that the drying position of the coated film can be controlled by controlling the temperature and the amount of drying air and the coating rate. Preferably, the coating rate is from 20 m/min. to 1,000 m/min., and the temperature of drying air is 60° C. or higher. Further, it is possible to perform preliminary drying before entering the magnet zone.

Use of heat resisting plastic rolls such as epoxy, polyimide, polyamide, and polyimide-amine, or metal rolls is effective for the calendering treatment. Especially, in the case where magnetic layers are coated on the both surface sides, metal rolls are usable for the treatment. The treatment temperature is preferably 50° C. or higher, and more preferably 100° C. or higher. The linear pressure is preferably 200 kg/cm (196 kN/m) or more, and more preferably 300 kg/cm (294 kN/m) or more.

[Physical Properties]

In the case where a ferromagnetic metal fine powder is used, the saturation magnetic flux density of the magnetic layer of the magnetic recording medium of the invention is 2,000 G (0.2 T) or more and 5,000 G (0.5 T) or less; and in the case where a hexagonal ferrite is used, it is 1,000 G (0.1 T) or higher and 3,000 G (0.3 T) or less. The coercive force (Hc) and (Hr) are 1,500 Oe (119.4 KA/m) or more and 5,000 Oe (398 KA/m) or less, and preferably 1,700 Oe (135.3 KA/m) or more and 3,000 Oe (238.8 KA/m) or less. The coercive force distribution is preferably narrow, and SFD and SFDr are preferably 0.6 or less. The squareness ratio is 0.55 or more and 0.67 or less, and preferably 0.58 or more and 0.64 or less in the case of two dimensional random orientation; preferably 0.45 or more and 0.55 or less in the case of three dimensional random orientation; 0.6 or more, and preferably 0.7 or more in the vertical direction in the case of vertical orientation; 0.7 or more, and preferably 0.8 or more in the case where diamagnetical correction is conducted, respectively. The orientation ratio of both of the two dimensional random orientation and the three dimensional random orientation is preferably 0.8 or more. In the case of the two dimensional random orientation, the squareness ratio, Br, Hc and Hr in the vertical direction are preferably within the range of from 0.1 to 0.5 times those in the in-plane direction.

In the case of magnetic tapes, the squareness ratio is 0.7 or more, and preferably 0.8 or more. The friction coefficient of the magnetic recording medium of the invention against a head at a temperature of from −10° C. to 40° C. and at a humidity of from 0% to 95% is 0.5 or less, and preferably 0.3 or less; the surface inherent resistivity of the magnetic surface is preferably from $10^4$ to $10^{12}$ Ω/sq; and the charge potential is preferably within the range of from −500 V to +500 V. The elastic modulus at 0.5% elongation of the magnetic layer is preferably from 100 to 2,000 kg/mm$^2$ (from 980 to 19,600 MPa) in every direction of in-plane; the breaking strength is preferably from 10 to 70 kg/mm$^2$ (from 98 to 686 MPa); the elastic modulus of the magnetic recording medium is preferably from 100 to 1,500 kg/mm$^2$ (from 980 to 14,700 MPa) in every direction of in-plane; the residual elongation is preferably 0.5% or less; and the thermal shrinkage factor at every temperature of 100° C. or lower is preferably 1% or less, more preferably 0.5% or less, and further preferably 0.1% or less. The glass transition temperature of the magnetic layer (the maximum of the elastic modulus loss by dynamic viscoelasticity measurement at 110 Hz) is preferably 50° C. or higher and 120° C. or lower, and that of the lower nonmagnetic layer is preferably from 0° C. to 100° C. The elastic modulus loss is preferably within the range of from $1\times10^8$ to $8\times10^9$ dyne/cm$^2$ (from $1\times10^3$ to $8\times10^4$ N/cm$^2$), and the loss tangent is preferably 0.2 or less. When the loss tangent is too large, adhesion failure is liable to occur. These thermal and mechanical characteristics are preferably substantially equal in every direction of in-plane of the medium with a difference within 10%. The residual amount of the solvent to be contained in the magnetic layer is preferably 100 mg/m$^2$ or less, and more preferably 10 mg/m$^2$ or less. The void ratio that the coated layer has is preferably 30% by volume or less, and more preferably 20% by volume or less in both of the nonmagnetic layer and the magnetic layer. For obtaining a high output, the void ratio is preferably smaller, but in some cases, a specific value should be secured depending on the purpose. For example, in the disc medium in which repeated use is considered important, a large void ratio contributes to good running durability in many cases.

The magnetic layer has a central plane average surface roughness (Ra) of 4.0 nm or less, preferably 3.8 nm or less, and more preferably 3.5 nm or less, as measured in an area of about 250 μm×250 μm by the MIRAU method using TOPO-3D manufactured by WYKO Corporation. The magnetic layer preferably has a maximum height (SRmax) of 0.5 μm or less, a ten point average roughness (SRz) of 0.3 μm or less, a central plane peak height (SRp) of 0.3 μm or less, a central plane valley depth (SRv) of 0.3 μm or less, a central surface area factor (SSr) of 20% or more and 80% or less, and an average wavelength (Sλa) of 5 μm or more and 300 μm or less. It is preferred to optimize the electromagnetic conversion characteristics and the friction coefficient by setting up the surface protrusions of the magnetic layer so as to have the foregoing values. These can easily be controlled by the control of the surface property due to fillers in the support, the particle size and the amount of the powders to be added to the magnetic layer, or the surface shape of rolls of the calender treatment. The range of curling is preferably within ±3 mm.

In the case where the magnetic recording medium of the invention comprises a nonmagnetic layer and a magnetic layer, one will be able to easily assume that these physical properties in the nonmagnetic layer and the magnetic layer can be varied according to the purposes. For example, the elastic modulus of the magnetic layer is made higher to enhance the running durability, and at the same time, the elastic modulus of the nonmagnetic layer is made lower than that of the magnetic layer to make the head touching of the magnetic recording medium good.

EXAMPLES

The invention will be specifically described below with reference to the following Example, but it should not be construed that the invention is limited thereto.

All parts in the following Example are parts by weight unless otherwise indicated.

<Support>

The measurement method of PSD of the invention is as follows.

Data measured under the following conditions using HD-2000 Model manufactured by WYKO Corporation was subjected to inclination correction and cylinder correction, and then to special frequency analysis to determine PSD at a prescribed wavelength (10 μm in Table 2). The measurement range is about 1,200 μm×900 μm.

<Ferromagnetic Powder>

The ferromagnetic powders used in the Example are shown in Table 1.

TABLE 1

| Ferromagnetic powder | Kind | Particle volume ($10^{-17}$ mL) | Hc (Oe) | σs (emu/g) | Analysis value of composition |
|---|---|---|---|---|---|
| A | BaF | 0.7 | 2,460 | 54 | Zn: 0.8, Co: 0.1, Nb: 04 |
| B | BaF | 0.2 | 2,480 | 51 | Zn: 0.6, Co: 0.1, Nb: 0.3 |
| C | BaF | 0.5 | 2,450 | 53 | Zn: 0.7, Co: 0.1, Nb: 0.3 |
| D | BaF | 1.6 | 2,510 | 57 | Zn: 0.9, Co: 0.1, Nb: 0.5 |
| E | BaF | 3.5 | 2,750 | 62 | Zn: 1.1, Co: 0.2, Nb: 0.6 |
| F | BaF | 0.7 | 3,060 | 56 | Zn: 1.0, Ni: 0.5, Ti: 0.4 |
| G | BaF | 0.7 | 3,520 | 58 | Zn: 0.4, Co: 0.1, Nb: 0.3 |
| H | BaF | 0.7 | 1,750 | 54 | Zn: 1.2, Co: 0.3, Nb: 0.4 |
| I | MP | 0.8 | 2,350 | 145 | Co: 2.8, Al: 7, Y: 4 |
| J | MP | 8 | 2,310 | 137 | Co: 21, Al: 17, Y: 5 |
| K | MP | 0.8 | 1,860 | 142 | Co: 25, Al: 10, Y: 2 |

*1: BaF: barium ferrite, MP: ferromagnetic metal powder
*2: In the BaF composition, the amount of each component is expressed by molar number per mole of Ba. MP is expressed by atomic % against Fe.

Magnetic tapes were prepared in the following methods using each of the ferromagnetic powders as shown in Table 1.

<Preparation of coating solution>

Magnetic layer coating solution 1 (hexagonal ferrite)

| | |
|---|---|
| Barium ferrite magnetic powder | 100 parts |
| Vinyl chloride copolymer | 6 parts |
| MR555 (manufactured by Zeon Corporation) | |
| Polyurethane resin | 3 parts |
| UR8200 (manufacture by Toyobo Co., Ltd.) | |
| α-Alumina (particle size: 0.3 μm) | 2 parts |
| HIT55 (manufactured by Sumitomo Chemical Co., Ltd.) | |
| Carbon black (particle size: 0.015 μm) | 5 parts |
| #55 (manufactured by Asahi Carbon Co., Ltd.) | |
| Butyl stearate | 1 part |
| Stearic acid | 2 parts |
| Methyl ethyl ketone | 125 parts |
| Cyclohexanone | 125 parts |

Magnetic layer coating solution 2 (ferromagnetic metal)

| | |
|---|---|
| Ferromagnetic metal fine powder | 100 parts |
| Vinyl chloride copolymer | 12 parts |
| MR110 (manufactured by Zeon Corporation) | |
| Polyurethane resin | 3 parts |
| UR8200 (manufacture by Toyobo Co., Ltd.) | |
| α-Alumina | 2 parts |
| HIT55 (manufactured by Sumitomo Chemical Co., Ltd.) | |
| Carbon black | 1 part |
| #55 (manufactured by Asahi Carbon Co., Ltd.) | |
| Butyl stearate | 1 part |
| Stearic acid | 5 parts |
| Methyl ethyl ketone | 100 parts |

<Preparation of coating solution>

| | |
|---|---|
| Cyclohexanone | 20 parts |
| Toluene | 60 parts |

Nonmagnetic coating solution 3 (for nonmagnetic layer)

| | |
|---|---|
| Nonmagnetic powder, $TiO_2$, crystalline rutile | 80 parts |
| Average primary particle size: 0.035 μm | |
| Specific surface area by the BET method: | 40 $m^2$/g |
| Content of $TiO_2$: | 90% or more |
| pH: | 7 |
| DBP oil absorption: | 27 to 38 g/100 g |
| Surface-treating agent, $Al_2O_3$: | 8% by weight |
| Carbon black | 20 parts |
| CONDUCTEX SC-U (manufactured by Columbia Carbon Company) | |
| Vinyl chloride copolymer | 12 parts |
| MR110 (manufactured by Zeon Corporation) | |
| Polyurethane resin | 5 parts |
| UR8200 (manufacture by Toyobo Co., Ltd.) | |
| Phenyphosphonic acid | 4 parts |
| Butyl stearate | 1 part |
| Stearic acid | 3 parts |

Preparation Method 1: Computer tapes (T1, T5 to T14, T18 and T19)

Each of the foregoing magnetic layer coating solution 1 and magnetic layer coating solution 2 was kneaded in a kneader and then dispersed for 4 hours in a sand mill. To each of the dispersion solutions was added 3 parts of polyisocyanate, to which was then added 40 parts of cyclohexanone. Each mixture was filtered through a filter having an average pore diameter of 1 μm to obtain coating solutions for forming the magnetic layer. Each of the coating solutions was coated on a support (see Table 2) having a thickness of 4.5 μm such that the thickness of the magnetic layer after drying was 0.10 μm and subjected to orientation by a cobalt magnet having a magnetic force of 6,000 G (0.6 T) and a solenoid having a magnetic force of 6,000 G (0.6 T) while the coated layer was still wet. After drying, the coated layer was subjected calendering treatment with calenders of 7 stages constructed of only metal rolls at a temperature of 85° C. at a rate of 200 m/min. Thereafter, a backing layer having a thickness of 0.5 μm (prepared by dispersing 100 parts of carbon black having an average particle size of 17 nm, 80 parts of calcium carbonate having an average particle size of 40 nm and 5 parts of α-alumina having an average particle size of 200 nm in a nitrocellulose resin, a polyurethane resin and a polyisocyanate) was coated. The obtained web was slit to a width of 3.8 m. The magnetic layer surface of the thus produced tape was cleaned with a tape cleaning device of non-woven fabric and a razor blade pressed against the surface of the tape, which was attached to a machine having delivery and winding-up movement of a slit product. There were thus obtained tape samples.

TABLE 2

(Evaluation results of magnetic tape)

| Medium No. | Remark | PSD ($\mu m^3$) | Ferromagnetic powder | Linear recording density (kbpi) | Track density (tpi) | Areal recording density (Gbit/$inch^2$) | $N_{30nm}$ (number/ 900 $\mu m^2$) | $N_{10nm}$ (number/ 900 $\mu m^2$) | V ($10^{-17}$ mL) | Hc (Oe) | CN ratio (dB) | Durability (%) |
|---|---|---|---|---|---|---|---|---|---|---|---|---|
| T1 | Example | 1,500 | A | 140 | 5,000 | 0.70 | 70 | 2,500 | 1.0 | 2,520 | 0.0 | 100 |
| T2 | Example | 1,500 | A | 140 | 5,000 | 0.70 | 40 | 1,500 | 1.2 | 2,530 | 1.3 | 110 |

TABLE 2-continued (Evaluation results of magnetic tape)

| Medium No. | Remark | PSD ($\mu m^3$) | Ferromagnetic powder | Linear recording density (kbpi) | Track density (tpi) | Areal recording density (Gbit/inch$^2$) | $N_{30nm}$ (number/ 900 $\mu m^2$) | $N_{10nm}$ (number/ 900 $\mu m^2$) | V ($10^{-17}$ mL) | Hc (Oe) | CN ratio (dB) | Durability (%) |
|---|---|---|---|---|---|---|---|---|---|---|---|---|
| T3 | Example | 1,500 | A | 140 | 5,000 | 0.70 | 5 | 900 | 0.9 | 2,480 | 1.2 | 120 |
| T4 | Comparison | 1,500 | A | 140 | 5,000 | 0.70 | 115 | 2,600 | 0.8 | 2,500 | -6.1 | 96 |
| T4 | Comparison | 1,500 | A | 100 | 4,000 | 0.40 | 115 | 2,600 | 0.8 | 2,500 | 2.0 | 92 |
| T5 | Example | 1,500 | B | 140 | 5,000 | 0.70 | 70 | 2,400 | 0.5 | 2,490 | 1.5 | 105 |
| T6 | Example | 1,500 | C | 140 | 5,000 | 0.70 | 70 | 2,300 | 0.8 | 2,530 | 1.6 | 102 |
| T7 | Example | 1,500 | D | 140 | 5,000 | 0.70 | 68 | 2,900 | 2.0 | 2,710 | 0.0 | 97 |
| T8 | Example | 1,500 | E | 140 | 5,000 | 0.70 | 68 | 2,800 | 4.0 | 2,780 | -1.2 | 130 |
| T9 | Comparison | 1,500 | E | 140 | 5,000 | 0.70 | 76 | 2,400 | 6.0 | 2,790 | -5.2 | 97 |
| T10 | Example | 1,500 | A | 200 | 7,500 | 1.50 | 70 | 2,200 | 1.1 | 2,560 | -1.2 | 103 |
| T11 | Example | 1,500 | F | 200 | 7,500 | 1.50 | 70 | 2,800 | 1.3 | 3,120 | -0.4 | 95 |
| T12 | Example | 1,500 | G | 200 | 7,500 | 1.50 | 70 | 2,600 | 0.9 | 3,650 | -0.2 | 110 |
| T13 | Example | 1,500 | H | 140 | 5,000 | 0.70 | 70 | 2,100 | 0.8 | 1,860 | -4.0 | 120 |
| T14 | Example | 1,500 | I | 140 | 5,000 | 0.70 | 75 | 2,000 | 1.2 | 2,390 | 0.1 | 96 |
| T15 | Comparison | 1,500 | I | 140 | 5,000 | 0.70 | 112 | 2,900 | 1.0 | 2,400 | -6.5 | 96 |
| T15 | Comparison | 1,500 | I | 100 | 4,000 | 0.40 | 112 | 2,900 | 1.0 | 2,400 | 2.3 | 120 |
| T16 | Example | 1,500 | I | 140 | 5,000 | 0.70 | 43 | 1,600 | 0.9 | 2,460 | 1.2 | 95 |
| T17 | Example | 1,500 | I | 140 | 5,000 | 0.70 | 8 | 800 | 1.3 | 2,450 | 2.0 | 97 |
| T18 | Comparison | 1,500 | J | 140 | 5,000 | 0.70 | 42 | 1,900 | 5.6 | 2,340 | -5.6 | 160 |
| T19 | Comparison | 1,500 | K | 140 | 5,000 | 0.70 | 2 | 1,500 | 1.0 | 1,960 | -3.9 | 95 |
| T20 | Example | 650 | A | 140 | 5,000 | 0.70 | 70 | 2,500 | 1.0 | 2,520 | 1.8 | 100 |
| T21 | Example | 3,900 | A | 140 | 5,000 | 0.70 | 70 | 2,500 | 1.0 | 2,520 | -0.5 | 110 |
| T22 | Comparison | 380 | A | 140 | 5,000 | 0.70 | 65 | 2,000 | 1.0 | 2,520 | 2.0 | 75 |
| T23 | Comparison | 5,500 | A | 140 | 5,000 | 0.70 | 75 | 2,500 | 1.0 | 2,520 | -2.0 | 110 |
| T24 | Example | 1,000 | A | 140 | 5,000 | 0.70 | 65 | 2,500 | 1.0 | 2,520 | 2.0 | 100 |
| T25 | Example | 2,500 | A | 140 | 5,000 | 0.70 | 75 | 2,600 | 1.0 | 2,520 | -0.3 | 110 |

A plane: magnetic layer forming plane side
Kind of base: T1 to T23: PEN, T24: aramid, T25: PET
PSD: value on the base A plane side Preparation Method 2: Computer Tapes (T2 and T16)

Computer tapes were obtained in the same manner as in Preparation Method 1, except that the dispersion in the sand mill was conducted for 6 hours.

Preparation Method 3: Computer Tapes (T3 and T17)

Computer tapes were obtained in the same manner as in Preparation Method 2, except that the α-alumina was changed from HIT55 to HIT82.

Preparation Method 4: Computer Tapes (T4 and T15)

Computer tapes were obtained in the same manner as in Preparation Method 1, except that the carbon black was changed from #55 to #35. The influence was also examined when the areal recording density was changed.

Preparation Method 5: Computer Tape (T20)

A computer tape was obtained in the same manner as in Preparation Method 1, except that the PSD of the support was changed to 680 $\mu m^3$.

Preparation Method 6: Computer Tape (T21)

A computer tape was obtained in the same manner as in Preparation Method 1, except that the PSD of the support was changed to 3,900 $\mu m^3$.

Preparation Method 7: Computer Tape (T22)

A computer tape was obtained in the same manner as in Preparation Method 1, except that the PSD of the support was changed to 380 $\mu m^3$.

Preparation Method 8: Computer Tape (T23)

A computer tape was obtained in the same manner as in Preparation Method 1, except that the PSD of the support was changed to 5,500 $\mu m^3$.

Preparation Method 9: Computer Tape (T24)

A computer tape was obtained in the same manner as in Preparation Method 1, except that the support was changed to aramid having a PSD of 1,000 $\mu m^3$.

Preparation Method 10: Computer Tape (T24)

A computer tape was obtained in the same manner as in Preparation Method 1, except that the support was changed to PET having a PSD of 2,500 $\mu m^3$.

Each of the performances of the thus prepared computer tapes T1 to T25 was evaluated by the following measurement methods.

(1) Magnetic Characteristics (Hc, σs):

The magnetic characteristics were measured using a vibrating sample magnetometer (VSM) (manufactured by Toei Industry Co., Ltd.) by Hm 10 KOe (796 KA/m).

(2) CN Ratio (Tape):

The CN ratio was measured using a drum tester having a recording head (MIG, gap: 0.15 $\mu$m, 1.8 T) and an MR head for reproduction installed therein at a head-medium relative rate of from 1 to 3 m/sec. The noise was measured as a modulation noise.

(3) Magnetic Switching Volume:

A sweep speed of the magnetic field of the Hc measurement section for 5 minutes and 30 minutes was measured using the foregoing VSM, and the magnetic switching volume was determined from the following relational equation between Hc and magnetic switching volume.

$$Hc=(2K/Ms)\{1-[(kT/KV)\ln(At/0.693)]^{1/2}\}$$

In the equation, K is an anisotropy constant; Ms is a saturation magnetization; k is a Boltzmann's constant; T is an absolute temperature; V is a magnetic switching volume; A is a spin precession frequency; and t is a magnetic switching time.

(4) Number of Surface Protrusions:

The number of fine protrusions ($N_{30nm}$ and $N_{10nm}$) in a 30 $\mu$m-square (900 $\mu m^2$) using an SiN-made probe having a quadrangular pyramid with a sharpness of 70° by Nano-Scope 3 (AFM: atomic force microscope) manufactured by Digital Instruments, Inc.

(5) Durability:

Prescribed signals were recorded using a DDS drive, and the tape was then made to run at 50° C. and 10% RH while monitoring reproduced signals. At the time when the reproducing output became 70% of the initial reproducing output, the tape was determined "NG". The evaluation was made with the sample T1 being 100%.

It is noted from Table 2 that the Examples in which the surface of the magnetic layer forming plane side of the support falls within the scope of the invention in terms of any of the PSD in the machine direction as measured by an interferometric roughness tester with a magnification of 5 times, $N_{30nm}$ as measured by AFM, the magnetic switching volume, and the coercive force (Hc) are high in the CN ratio even at a high areal recording density (0.5 Gbit/inch$^2$ or more) and excellent in the durability.

In contrast, the comparisons T4 and T15 are examples in which the $N_{30nm}$ exceeds 100/900 $\mu m^2$, and the areal recording density is changed. In this case, those in which the areal recording density is 0.5 Gbit/inch$^2$ or more are low in the CN ratio. On the other hand, those in which the areal recording density is low (lower than 0.5 Gbit/inch$^2$), the CN ratio is good. It can be understood from this matter that when the $N_{30nm}$ is 100/900 $\mu m^2$, the increase of the noise derived from the surface property of the magnetic layer can be suppressed, and a high CN ratio is obtained, and in particular, as the recording density increases, this tendency becomes evident.

Further, in the comparisons T9 and T18, since the magnetic switching volume (V) exceeds $5 \times 10^{-17}$ mL, the CN ratio is low. It can be understood from this matter that when the magnetic switching volume (V) is less than $5 \times 10^{-17}$ mL, the increase of the noise can be suppressed, and a high CN ratio is obtained. In addition, in the comparisons T13 and T19, since the coercive force (Hc) of the magnetic layer is less than 2,000 Oe (159.2 KA/m), the CN ratio is low. It can be understood from this matter that when the coercive force (Hc) of the magnetic layer is 2,000 Oe (159.2 KA/m) or more, a high CN ratio can be obtained. Moreover, in the comparison T22, since though the magnetic switching volume (V) and the coercive force (Hc) fall within the scope of the invention, the PSD of the support is lower than 500 $\mu m^3$, the durability is deteriorated. It can be understood from this matter that when the PSD of the support can be made 500 $\mu m^3$ or more, sufficient durability is obtained. Still further, in the comparison T23, though the $N_{30nm}$, the magnetic switching volume (V) and the coercive force (Hc) fall within the scope of the invention, the PSD of the support is higher than 4,000 $\mu m^3$, and the CN ratio is low. It can be understood from this matter that when the PSD of the support exceeds 4,000 $\mu m^3$, the CN ratio is low.

The invention can provide a coating type magnetic recording medium having good electromagnetic conversion characteristics, especially a markedly improved CN ratio in a high density recording region, combined with an MR head, which is low in the noise in a recording/reproduction process.

This application is based on Japanese Patent application JP 2002-143071, filed May 17, 2002, the entire content of which is hereby incorporated by reference, the same as if set forth at length.

What is claimed is:

1. A magnetic recording medium comprising:
   a support; and
   a magnetic layer comprising a ferromagnetic powder and a binder,
   wherein the magnetic layer has 100 or less protrusions per 900 $\mu m^2$ on a surface thereof, the protrusion having a height, as measured by AFM, of 30 nm or more,
   the magnetic layer has a magnetic switching volume of from $0.1 \times 10^{-17}$ to $5 \times 10^{-17}$ mL,
   the magnetic layer has a coercive force of 2,000 Oe (159.2 KA/m) or more, and
   a surface of the support, the surface being opposed to the magnetic layer, has a PSD in a machine direction, as measured by an interferometric roughness tester with a magnification of 5 times, of from 500 to 4,000 $\mu m^3$ at a space wavelength of 10 $\mu m$.

2. The magnetic recording medium according to claim 1, wherein the surface of the support has a PSD in a machine direction, as measured by an interferometric roughness tester with a magnification of 5 times, of from 800 to 2,000 $\mu m^3$ at a space wavelength of 10 $\mu m$.

3. The magnetic recording medium according to claim 1, wherein the surface of the support has a PSD in a machine direction, as measured by an interferometric roughness tester with a magnification of 5 times, of from 800 to 8,000 $\mu m^3$ at a space wavelength of 20 $\mu m$.

4. The magnetic recording medium according to claim 1, wherein the surface of the support has a PSD in a machine direction, as measured by an interferometric roughness tester with a magnification of 5 times, of from 1000 to 4,000 $\mu m^3$ at a space wavelength of 20 $\mu m$.

5. The magnetic recording medium according to claim 1, wherein the support has a central plane average surface roughness of 8.0 nm or less.

6. The magnetic recording medium according to claim 1, wherein the support has a central plane average surface roughness of 4.0 nm or less.

7. The magnetic recording medium according to claim 1, wherein the support has a central plane average surface roughness of 2.0 nm or less.

8. The magnetic recording medium according to claim 1, wherein the magnetic layer has 50 or less protrusions per 900 $\mu m^2$ on a surface thereof, the protrusion having a height, as measured by AFM, of 30 nm or more.

9. The magnetic recording medium according to claim 1, wherein the magnetic layer has 500 to 10000 protrusions per 900 $\mu m^2$ on a surface thereof, the protrusion having a height, as measured by AFM, of 10 nm or more.

10. The magnetic recording medium according to claim 1, wherein the magnetic layer has 1000 to 5000 protrusions per 900 $\mu m^2$ on a surface thereof, the protrusion having a height, as measured by AFM, of 10 nm or more.

11. A reproduction process comprising reproducing a magnetic recording medium by an MR head, wherein the magnetic recording medium comprises:
   a support; and
   a magnetic layer comprising a ferromagnetic powder and a binder,
   wherein the magnetic layer has 100 or less protrusions per 900 $\mu m^2$ on a surface thereof, the protrusion having a height, as measured by AFM, of 30 nm or more,
   the magnetic layer has a magnetic switching volume of from $0.1 \times 10^{-17}$ to $5 \times 10^{-17}$ mL,
   the magnetic layer has a coercive force of 2,000 Oe (159.2 KA/m) or more, and
   a surface of the support, the surface being opposed to the magnetic layer, has a PSD in a machine direction, as measured by an interferometric roughness tester with a magnification of 5 times, of from 500 to 4,000 $\mu m^3$ at a space wavelength of 10 $\mu m$.

12. The reproduction process according to claim 11, wherein the surface of the support has a PSD in a machine direction, as measured by an interferometric roughness tester with a magnification of 5 times, of from 800 to 2,000 $\mu m^3$ at a space wavelength of 10 $\mu m$.

13. The reproduction process according to claim 11, wherein the surface of the support has a PSD in a machine direction, as measured by an interferometric roughness tester with a magnification of 5 times, of from 800 to 8,000 $\mu m^3$ at a space wavelength of 20 $\mu m$.

14. The reproduction process according to claim 11, wherein the surface of the support has a PSD in a machine direction, as measured by an interferometric roughness tester with a magnification of 5 times, of from 1000 to 4,000 $\mu m^3$ at a space wavelength of 20 $\mu m$.

15. The reproduction process according to claim 11, wherein the support has a central plane average surface roughness of 8.0 nm or less.

16. The reproduction process according to claim 11, wherein the support has a central plane average surface roughness of 4.0 nm or less.

17. The reproduction process according to claim 11, wherein the support has a central plane average surface roughness of 2.0 nm or less.

18. The reproduction process according to claim 11, wherein the magnetic layer has 50 or less protrusions per 900 $\mu m^2$ on a surface thereof, the protrusion having a height, as measured by AFM, of 30 nm or more.

19. The reproduction process according to claim 11, wherein the magnetic layer has 500 to 10000 protrusions per 900 $\mu m^2$ on a surface thereof, the protrusion having a height, as measured by AFM, of 10 nm or more.

20. The reproduction process according to claim 11, wherein the magnetic layer has 1000 to 5000 protrusions per 900 $\mu m^2$ on a surface thereof, the protrusion having a height, as measured by AFM, of 10 nm or more.

* * * * *